United States Patent
Désor et al.

[11] Patent Number: 6,005,042
[45] Date of Patent: Dec. 21, 1999

[54] AQUEOUS POLYMER DISPERSIONS AS BINDERS FOR ELASTIC, NONBLOCKING AND SCRATCH-RESISTANT COATINGS

[75] Inventors: Ulrich Désor, Idstein; Stephan Krieger, Hofheim, both of Germany

[73] Assignee: Clariant GmbH, Frankfurt, Germany

[21] Appl. No.: 08/811,168

[22] Filed: Mar. 4, 1997

[30] Foreign Application Priority Data

Mar. 11, 1996 [DE] Germany ............... 196 09 509

[51] Int. Cl.$^6$ ................. C08F 2/22; C08F 2/24
[52] U.S. Cl. ............... 524/460; 523/201; 524/521; 524/522; 526/201
[58] Field of Search ............. 523/201; 524/460, 524/521, 522; 526/201

[56] References Cited

U.S. PATENT DOCUMENTS

| | | | |
|---|---|---|---|
| 4,210,565 | 7/1980 | Emmons ............... | 260/29.6 TA |
| 4,226,752 | 10/1980 | Erickson et al. ....... | 260/29.6 RB |
| 4,654,397 | 3/1987 | Mueller-Mall et al. .. | 524/460 |
| 4,988,762 | 1/1991 | Overbeek et al. ...... | 524/839 |
| 5,284,752 | 2/1994 | Sutton ............... | 523/332 |
| 5,308,890 | 5/1994 | Snyder ............... | 523/201 |
| 5,498,659 | 3/1996 | Esser ................ | 524/549 |

FOREIGN PATENT DOCUMENTS

| | | |
|---|---|---|
| 31064/89 | 9/1989 | Australia. |
| 0 015 644 | 9/1980 | European Pat. Off.. |
| 555774 | 8/1993 | European Pat. Off.. |
| 2044867 | 5/1971 | Germany. |
| 3443964 | 6/1986 | Germany. |
| 2298208 | 8/1996 | United Kingdom. |
| WO 96/16998 | 6/1996 | WIPO. |

*Primary Examiner*—Judy M. Reddick
*Attorney, Agent, or Firm*—Philip P. McCann

[57] ABSTRACT

A polymer dispersion having a minimum film-forming temperature in the range from 0 to 40° C., which is useful in coating compositions for substrates, in the form of varnishes or gloss paints, is obtained by stepwise emulsion polymerization, which includes polymerizing, onto a first stage having the monomer composition I comprising: from 50 to 68.5% by weight of soft monomers A whose homopolymers have a glass transition temperature ($T_g$) below 0° C.; from 30 to 50% by weight of hard monomers B whose homopolymers have a glass transition temperature ($T_g$) above 65° C.; from 0.5 to 5% by weight of α,β-unsaturated carboxylic acids and/or carboxamides C which are copolymerizable with A and B; from 1 to 7.5% by weight of ethylenically unsaturated monomers D containing keto groups; and from 0 to 10% by weight of other ethylenically unsaturated monomers E which do not contain a nitrogen atom, where the weight percentages in each case are based on the overall amount of the polymer of the first stage, a second stage having the monomer composition II comprising: from 5 to 45% by weight of soft monomers A whose homopolymers have a glass transition temperature ($T_g$) below 0° C.; from 65 to 95% by weight of hard monomers B whose homopolymers have a glass transition temperature ($T_g$) above 65° C.; from 0 to 4% by weight of α,β-unsaturated carboxylic acids and/or carboxamides C which are copolymerizable with A and B; from 0 to 5% by weight of ethylenically unsaturated monomers D containing keto groups; and from 0 to 10% by weight of other ethylenically unsaturated monomers E which do not contain a nitrogen atom, where the weight percentages in each case are based on the overall amount of the polymer of the second stage, in a weight ratio of the monomer composition I to the monomer composition II of from 50:50 to 75:25.

15 Claims, No Drawings

AQUEOUS POLYMER DISPERSIONS AS BINDERS FOR ELASTIC, NONBLOCKING AND SCRATCH-RESISTANT COATINGS

BACKGROUND OF THE INVENTION

1. Field of the Invention

The present invention relates to polymer dispersions which form elastic films of high blocking resistance and scratch resistance in the range of from 0 to 40° C., to processes for their preparation, and to their use, for example, as binders for the coating of substrates.

2. Description of Related Art

To prepare aqueous coatings that are applied to substrates which are not dimensionally stable, (e.g., wood varnishes, stains and gloss paints), there is a need for binders with a level of elasticity sufficient to avoid cracking when the coating is exposed to weathering. In addition, however, these coatings are also required to have a certain hardness, so that the coating possesses good scratch resistance and blocking resistance. From an environmental perspective, it also is desired that the binder form a film within the range from 0 to 40° C., so that little or no film consolidating agent is required.

From EP-B 0 184 091 and EP-B 0 015 644 it is known that it is possible, by multi-stage emulsion polymerization, to prepare aqueous auto-crosslinking polymer dispersions which have a low minimum film-forming temperature (MFT) and which form films with high blocking resistance. Owing to the use of a relatively high proportion of soft monomers in the first stage, however, the corresponding polymer films have deficiencies in the context of their scratch resistance. It generally was thought possible to compensate for this by using larger amounts of auto-crosslinking groups, but the result of such use would be a worsening in the elongation at break in addition to a higher price.

Multi-stage polymers as described in EP-B 0 332 011, possessing an MFT in the range from 65 to 110° C., form highly scratch-resistant films but, when used as binders, require a large amount of film consolidating agent. Moreover, the elongation at break of the corresponding films made from these multi-stage polymers is not adequate for use on substrates which are not dimensionally stable.

Thus, there exists a need to provide polymers and polymer dispersions that can be made into films having sufficient elasticity and that have high blocking resistance and scratch resistance. There also exists a need to provide polymers and polymer dispersions that can be used as binders for coatings on substrates that are not dimensionally stable.

SUMMARY OF THE INVENTION

An object of the present invention is to provide a polymer dispersion having an MFT in the range from 0 to 40° C. and which forms a polymer film which possesses not only high blocking resistance and scratch resistance but also sufficient elasticity for the coating of substrates that are not dimensionally stable. An additional object of the invention is to provide a polymer dispersion which is suitable, in particular, for the production of wood varnishes, stains and gloss paints.

In accordance with these and other objectives of the present invention, there is provided a polymer dispersion prepared by means of stepwise emulsion polymerization of monomer mixtures which include a proportion of hard monomers of at least 30% by weight in the first polymerization stage and at least 65% by weight in the second polymerization stage. The invention provides a polymer dispersion having a minimum film-forming temperature (MFT) in the range of from 0 to 40° C., which is obtainable by stepwise emulsion polymerization which comprises polymerizing, in a first stage, a monomer composition I comprising

| | |
|---|---|
| from 50 to 68.5% by weight | of soft monomers A whose homopolymers have a glass transition temperature ($T_g$) below 0° C., |
| from 30 to 50% by weight | of hard monomers B whose homopolymers have a glass transition temperature ($T_g$) above 65° C., |
| from 0.5 to 5% by weight | of α, β-unsaturated carboxylic acids and/or carboxamides C which are co-polymerizable with A and B, |
| from 1 to 7.5% by weight | of ethylenically unsaturated monomers D containing keto groups, and |
| from 0 to 10% by weight | of other ethylenically unsaturated monomers E which do not contain a nitrogen atom, | whereby the weight is based in each case on the overall amount of the polymer of the first stage, and in a second stage, a monomer composition II comprising

| | |
|---|---|
| from 5 to 45% by weight | of soft monomers A' whose homopolymers have a glass transition temperature ($T_g$) below 0° C., |
| from 65 to 95% by weight | of hard monomers B' whose homopolymers have a glass transition temperature ($T_g$) above 65° C., |
| from 0 to 4% by weight | of α, β-unsaturated carboxylic acids and/or carboxamides C' which are copolymerizable with A' and B', |
| from 0 to 5% by weight | of ethylenically unsaturated monomers D' containing keto groups, and |
| from 0 to 10% by weight | of other ethylenically unsaturated monomers E' which do not contain a nitrogen atom, | whereby the weight is based in each case on the overall amount of the polymer of the second stage, and whereby the weight ratio of the monomer composition I to the monomer composition II is from 50:50 to 75:25, preferably from 50:50 to 65:35.

DETAILED DESCRIPTION OF PREFERRED EMBODIMENTS

Any monomers A–E (and A'–E') can be used that meet the above definitions. Mixtures of these monomers also are useful in accordance with the present invention. Throughout this description, the expression "soft monomers A" and "soft monomers A'" or "monomers A" and "monomers A'" denotes monomers whose corresponding homopolymers have a glass transition temperature $T_g$ below 0° C., preferably below −10° C., and more preferably below −15° C., such as $C_1$–$C_{12}$-alkyl esters of acrylic acid or $C_5$–$C_{12}$-alkyl esters of methacrylic acid, for example butyl acrylate, n-octyl acrylate and 2-ethylhexyl acrylate. These monomers A are preferably used in monomer composition I in a range of from 50 to 68.5% by weight, and more preferably, from 55 to 60% by weight, based on the weight of the overall amount of the polymer in monomer composition I. Monomers A' also are preferably used in monomer composition II in a range of from 5 to 45% by weight, and more preferably, from 15 to 30% by weight, based on the weight of the overall amount of the polymer in monomer composition II.

Throughout this description, the expression "hard monomers B" and "hard monomers B'" or "monomers B" and "monomers B'" denotes monomers whose corresponding homopolymers have a glass transition temperature $T_g$ above 65° C., preferably above 85° C., and more preferably above 95° C., examples being styrene, vinyltoluene, acrylonitrile, methacrylonitrile and also $C_1$–$C_4$-alkyl esters or cycloalkyl esters of methacrylic acid, for example methyl methacrylate, cyclohexyl methacrylate, isobornyl methacrylate and tert-butyl methacrylate. These monomers B are preferably used in monomer composition I in a range of from 30 to 50% by weight, and more preferably, from 35 to 45% by weight, based on the weight of the overall amount of the polymer in monomer composition I. Monomers B' also are preferably used in monomer composition II in a range of from 65 to 95% by weight, and more preferably, from 75 to 85% by weight, based on the weight of the overall amount of the polymer in monomer composition II. In the monomer composition I, it is preferred to employ at least 50% by weight of styrene, preferably at least 60% by weight, based on the overall amount of hard monomers B.

The α,β-unsaturated carboxylic acids and carboxamides (C and C') that are copolymerizable with hard monomers A and B preferably are those having 3 to 8 carbon atoms, for example acrylic acid, methacrylic acid, itaconic acid, acrylamide and methacrylamide. Suitable ethylenically unsaturated monomers D (and D') containing keto groups are, preferably, monomers containing acetoacetoxy groups, for example acetoacetoxyethyl methacrylate, acetoacetoxybutyl methacrylate, acrylamidomethylacetylacetone and vinyl acetoacetate, polymerizable derivatives of diacetone, for example diacetoneacrylamide and diacetonemethacrylamide, and butanonemethacrylic esters. The monomer composition I for the first stage of polymerization preferably includes a larger proportion of monomers C and D than the monomer composition II for the second stage. These components C are preferably used in monomer composition I in a range of from 0.5 to 5% by weight, and more preferably, from 1 to 3% by weight, based on the weight of the overall amount of the polymer in monomer composition I. Components C' also are preferably used in monomer composition II in a range of from 0 to 4% by weight, and more preferably, from 1 to 2% by weight, based on the weight of the overall amount of the polymer in monomer composition II. These monomers D are preferably used in monomer composition I in a range of from 1 to 7.5% by weight, and more preferably, from 2 to 4% by weight, based on the weight of the overall amount of the polymer in monomer composition I. Monomers D' also are preferably used in monomer composition II in a range of from 0 to 5% by weight, and more preferably, from 1 to 3% by weight, based on the weight of the overall amount of the polymer in monomer composition II.

Ethylenically unsaturated monomers E (and E') that can be incorporated, if desired, by copolymerization are, preferably, hydroxyalkyl (meth)acrylates, glycidyl (meth)acrylates, alkoxyvinylsilanes and (meth)acryloyloxyalkylsilanes. Monomers E are preferably used in monomer composition I in a range of from 0 to 10% by weight, and more preferably, from 3 to 7% by weight, based on the weight of the overall amount of the polymer in monomer composition I. Monomers E' also are preferably used in monomer composition II in a range of from 0 to 10% by weight, and more preferably, from 3 to 7% by weight, based on the weight of the overall amount of the polymer in monomer composition II.

Those skilled in the art will appreciate that the same or different monomers A–E can be used for monomers A'–E'. The skilled artisan also will appreciate that mixtures of monomers A–E can be used for monomers A–E, and that mixtures of monomers A'–E' can be used for monomers A'–E'.

To increase the chemical resistance, the dispersion may also include polyfunctional carboxylic hydrazides F, which thus contain at least two hydrazide groups in the molecule, examples being adipic dihydrazide, oxalic dihydrazide, isophthalic dihydrazide and polyacrylic polyhydrazide. The ratio of hydrazide groups to keto groups incorporated in the polymer by way of monomers D preferably is from 0.5:1 to 1:0.5, and in particular is an equimolar ratio.

The present invention also provides a process for preparing a polymer dispersion as described above by step-wise emulsion polymerization. The step-wise emulsion polymerization preferably is carried out in accordance with the customary techniques of emulsion polymerization. Preferably, the process of step-wise emulsion polymerization is carried out by first emulsifying and polymerizing the monomer composition I of the first stage in an aqueous phase in the presence of emulsifiers, initiators and, if desired, protective colloids, at suitable temperatures of, for example from 60 to 95° C., and subsequently polymerizing the monomer composition II of the second stage in the presence of the polymerized composition I, at suitable temperatures of, for example, from 60° C. to 95° C., via initiators. It is preferred to operate in accordance with the emulsion feed technique, in which a small amount of the monomer composition I is prepolymerized and then, in succession, the remaining amount of the monomer composition I and thereafter the monomer composition II are metered in, preferably in the form of an aqueous emulsion. Alternatively, it also is possible to carry out a monomer feed of I and II in succession, as well as a successive batch polymerization of I and II.

The preparation of high-quality dispersions in accordance with the present invention preferably takes place in the presence of emulsifiers and/or protective colloids. Any emulsion and/or colloid can be used in their effective amounts. Based on the content of polymer, the dispersions may include the customarily used amounts of up to 3% by weight, preferably up to 2% by weight, more preferably from 0.5 to 1% by weight of ionic emulsifiers and/or up to 6% by weight, preferably up to 4% by weight, and more preferably from 0.5 to 2% by weight of nonionic emulsifiers. Suitable nonionic emulsifiers include alkylpolyglycol ethers, such as ethoxylation products of lauryl, oleyl or stearyl alcohol or of coconut fatty alcohol, alkyl phenol polyglycol ethers, such as ethoxylation products of octylphenol or nonylphenol, diisopropylphenol, triisopropylphenol or of di- or tri-tert-butyl phenol, or ethoxylation products of polypropylene oxide. Suitable ionic emulsifiers include primarily anionic emulsifiers. These anionic emulsifiers may comprise the alkali metal or ammonium salts of alkyl-, aryl- or alkylaryl-sulfonates or of alkyl, aryl or alkylaryl sulfates, phosphates or phosphonates, whereby it also is possible for oligo- or polyethylene oxide units to be located between the hydrocarbon radical and the anionic group. Typical examples include sodium lauryl sulfate, sodium undecylglycol ether sulfate, sodium octylphenol glycol ether sulfate, sodium dodecylbenzene sulfonate, sodium lauryldiglycol sulfate, and ammonium tri-tert-butylphenol-penta- or -octaglycol sulfate.

Useful protective colloids, if desired, include natural substances such as gum arabic, starch, alginates or modified natural substances, e.g., methyl-, ethyl-, hydroxyalkyl- or carboxymethylcellulose, or entirely synthetic substances, examples being polyvinyl alcohol and polyvinyl pyrrolidone. Preferably, it is possible to use modified cellulose derivatives and synthetic protective colloids. When using the described monomer systems, however, the use of these protective colloids typically is possible only to a limited extent. The amounts which can be used are in many cases only from 0.001 to 1% by weight, and the compatibility and nature of the addition must be checked for each individual case.

Any known mechanisms may be employed for initiating and continuing the polymerization. Preferably, oil-soluble and/or, water-soluble free-radical initiators or redox systems can be used. More preferably, water-soluble free-radical initiators or redox systems are used. Suitable examples of these initiators include hydrogen peroxide, potassium or ammonium peroxodisulfate, dibenzoyl peroxide, lauryl peroxide, tri-tert-butyl peroxide, bisazodiisobutyronitrile, alone or together with reducing components, for example sodium bisulfite, ®Rongalit (BASF), glucose, ascorbic acid.

In addition, it is possible to use regulators, such as mercaptans, and other customary auxiliaries which are known to the skilled worker for emulsion polymerization. The dispersions usually are neutralized with aqueous ammonia, alkali metal and alkaline earth metal hydroxide solutions and can be adjusted to a pH of from 6.5 to 10, preferably from 7.0 to 9.0. Those skilled in the art are capable of carrying out the emulsion polymerization using the above-mentioned emulsifiers, protective colloids, initiators, regulators, neutralizers and the like using the guidelines provided herein.

Optionally, the polyfunctional carboxylic acid hydrazides F, preferably in aqueous solution, are added to the polymer dispersion.

Despite the use of a relatively high proportion of hard monomers B in the first stage I, the films prepared from the novel dispersions surprisingly show high elongation at break and sufficient elasticity for the coating of substrates which are not dimensionally stable. The present invention additionally provides for the use of the inventive polymer dispersion as a binder for the coating of substrates.

On the basis of the novel polymer dispersion, it further is possible to produce pigmented and unpigmented varnishes, stains and paints, especially gloss paints, for the coating of wood and other substrates. These coating materials can be produced using the customary additives, such as wetting agents, for example aminomethylpropanol, antifoams, for example silicones and mineral oils, thickeners based on polyacrylates or polyurethanes, waxes based on paraffin or polyethylene, film-forming auxiliaries, for example ®Texanol (Eastman) or butyldiglycol, pigments, for example titanium dioxide, fillers, dispersants, preservatives, matting agents and other additives which are known to the skilled worker. Those skilled in the art are capable of producing the aforementioned pigmented and unpigmented varnishes, stains and paints using the guidelines presented herein.

The invention now will be explained by reference to the following non- limiting examples. The parts and percentages indicated in the examples below are by weight unless noted otherwise.

EXAMPLES

Example 1

The following components were charged to a 2 l reactor:
410.00 parts of water;
13.24 parts of $C_{11}$-alkyl ether sulfate Na salt with about 7 ethylene oxide units, 34% strength; and
30.00 parts of monomer emulsion I (described below).

These components were heated to 80° C., and 0.375 part of ammonium peroxodisulfate in 10 parts of water was added. Subsequently, the remaining monomer emulsion I and then the monomer emulsion II, (described below), together with 2.3 parts of ammonium peroxodisulfate dissolved in 40 parts of water, were metered in over the course of 3.5 hours. Heating was continued for 60 minutes more, and then the batch was cooled. The pH was adjusted to 9.0 using 25% strength ammonia solution. A 10% strength adipic dihydrazide solution (81 parts) were then added to the dispersion. The solids content in the dispersion was about 47% and the MFT was about 18° C.

The monomer emulsion I was prepared by stirring the following:

| | |
|---|---|
| 192.13 | parts of water; |
| 14.56 | parts of $C_{11}$-alkyl ether sulfate Na salt with about 7 ethylene oxide units, 34% strength; |
| 144.38 | parts of styrene; |
| 268.13 | parts of butyl acrylate; |
| 12.38 | parts of methacrylic acid; and |
| 12.38 | parts of diacetoneacrylamide | with a high-speed stirrer until a stable emulsion was formed.

The monomer emulsion II was prepared by stirring the following:

| | |
|---|---|
| 157.20 | parts of water; |
| 11.91 | parts of $C_{11}$-alkyl ether sulfate Na salt with about 7 ethylene oxide units, 34% strength; |
| 33.75 | parts of styrene; |
| 67.50 | parts of butyl acrylate; |
| 236.25 | parts of methyl methacrylate; |
| 3.38 | parts of methacrylic acid; and |
| 3.38 | parts of diacetoneacrylamide | with a high-speed stirrer until a stable emulsion was formed.

Example 2

The following components were charged to a 2 l reactor:

| | |
|---|---|
| 410.00 | parts of water; |
| 13.24 | parts of $C_{11}$-alkyl ether sulfate Na salt with about 7 ethylene oxide units, 34% strength; and |
| 30.00 | parts of monomer emulsion I (described below). |

These components were heated to 80° C., and 0.375 part of ammonium peroxodisulfate in 10 parts of water was added. Subsequently, the remaining monomer emulsion I and then the monomer emulsion II, (described below), together with 2.3 parts of ammonium peroxodisulfate dissolved in 40 parts of water, were metered in over the course of 3.5 hours. Heating was continued for 60 minutes more, and then the batch was cooled. The pH was adjusted to 9.0 using 25% strength ammonia solution. A 10% strength adipic dihydrazide solution (131 parts) was then added to the dispersion. The solids content in the dispersion was about 47% and the MFT was about 19° C.

The monomer emulsion I was prepared by stirring the following:

| | |
|---|---|
| 192.79 | parts of water; |
| 15.88 | parts of $C_{11}$-alkyl ether sulfate Na salt with about 7 |

-continued

| | |
|---|---|
| 180.00 | ethylene oxide units, 34% strength; parts of styrene; |
| 270.13 | parts of butyl acrylate; |
| 13.50 | parts of methacrylic acid; and |
| 22.50 | parts of diacetoneacrylamide | with a high-speed stirrer until a stable emulsion was formed.

The monomer emulsion II was prepared by stirring the following:

| | |
|---|---|
| 128.53 | parts of water; |
| 10.59 | parts of $C_{11}$-alkyl ether sulfate Na salt with about 7 ethylene oxide units, 34% strength; |
| 60.00 | parts of acrylate; |
| 240.00 | parts of methyl methacrylate; |
| 3.00 | parts of methacrylic acid; and |
| 3.00 | parts of diacetoneacrylamide | with a high-speed stirrer until a stable emulsion was formed.

Example 3

The following components were charged to a 2 l reactor:

| | |
|---|---|
| 410.00 | parts of water; |
| 13.24 | parts of $C_{11}$-alkyl ether sulfate Na salt with about 7 ethylene oxide units, 34% strength; |
| 30.00 | parts of monomer emulsion I (described below). |

The components were heated to 80° C., and 0.375 part of ammonium peroxodisulfate in 10 parts of water was added. Subsequently, the remaining monomer emulsion I and then the monomer emulsion II, (described below), together with 2.3 parts of ammonium peroxodisulfate dissolved in 40 parts of water, were metered in over the course of 3.5 hours. Heating was continued for 60 minutes more, and then the batch was cooled. The pH was adjusted to 9.0 using 25% strength ammonia solution. A 10% strength adipic dihydrazide solution (85 parts) was then added to the dispersion. The solids content in the dispersion was about 47% and the MFT was about 10° C.

The monomer emulsion I was prepared by stirring the following:

| | |
|---|---|
| 208.68 | parts of water; |
| 15.88 | parts of $C_{11}$-alkyl ether sulfate Na salt with about 7 ethylene oxide units, 34% strength; |
| 180.00 | parts of styrene; |
| 270.00 | parts of ethylhexyl acrylate; |
| 13.50 | parts of methacrylic acid; and |
| 13.50 | parts of diacetoneacrylamide | with a high-speed stirrer until a stable emulsion was formed.

The monomer emulsion II was prepared by stirring the following:

| | |
|---|---|
| 139.12 | parts of water; |
| 10.59 | parts of $C_{11}$-alkyl ether sulfate Na salt with about 7 ethylene oxide units, 34% strength; |
| 60.00 | parts of butyl acrylate; |
| 240.00 | parts of methyl methacrylate; |
| 3.00 | parts of methacrylic acid; and |
| 3.00 | parts of diacetoneacrylamide | with a high-speed stirrer until a stable emulsion was formed.

Example 4

The following components were charged to a 2 l reactor:

| | |
|---|---|
| 410.00 | parts of water; |
| 13.24 | parts of $C_{11}$-alkyl ether sulfate Na salt with about 7 ethylene oxide units, 34% strength; and |
| 30.00 | parts of monomer emulsion I (described below). |

The components were heated to 80° C., and 0.375 part of ammonium peroxodisulfate in 10 parts of water was added. Subsequently, the remaining monomer emulsion I and then the monomer emulsion II, (described below), together with 2.3 parts of ammonium peroxodisulfate dissolved in 40 parts of water, were metered in over the course of 3.5 hours. Heating was continued for 60 minutes more, and then the batch was cooled. The pH was adjusted to 9.0 using 25% strength ammonia solution. The solids content in the dispersion was about 47% and the MFT was <0° C.

The monomer emulsion I was prepared by stifling the following:

| | |
|---|---|
| 210.00 | parts of water; |
| 13.23 | parts of $C_{11}$-alkyl ether sulfate Na salt with about 7 ethylene oxide units, 34% strength; |
| 101.25 | parts of styrene; |
| 255.00 | parts of ethylhexyl acrylate; |
| 18.75 | parts of methyl methacrylate; |
| 11.25 | parts of methacrylic acid; and |
| 11.25 | parts of acetylacetoxyethyl methacrylate | with a high-speed stirrer until a stable emulsion was formed.

The monomer emulsion II was prepared by stirring the following:

| | |
|---|---|
| 210.00 | parts of water; |
| 13.23 | parts of $C_{11}$-alkyl ether sulfate Na salt with about 7 ethylene oxide units, 34% strength; |
| 112.50 | parts of ethylhexyl acrylate; |
| 262.50 | parts of methyl methacrylate; |
| 3.75 | parts of methacrylic acid; and |
| 11.25 | parts of acetylacetoxyethyl methacrylate | with a high-speed stirrer until a stable emulsion was formed.

Comparison Example 1

The following components were charged to a 2 l reactor:

| | |
|---|---|
| 410.00 | parts of water; |
| 13.24 | parts of $C_{11}$-alkyl ether sulfate Na salt with about 7 ethylene oxide units, 34% strength; and |
| 30.00 | parts of monomer emulsion I (described below). |

The components were heated to 80° C., and 0.375 part of ammonium peroxodisulfate in 10 parts of water was added. Subsequently, the remaining monomer emulsion I and then the monomer emulsion II, together with 2.3 parts of ammonium peroxodisulfate dissolved in 40 parts of water, were metered in over the course of 3.5 hours. Heating was continued for 60 minutes more, and then the batch was cooled. The pH was adjusted to 9.0 using 25% strength ammonia solution. The solids content in the dispersion was about 47% and the MFT was >44° C.

The monomer emulsion I was prepared by stilling the following:

| | |
|---|---|
| 326.83 | parts of water; |
| 20.65 | parts of $C_{11}$-alkyl ether sulfate Na salt with about 7 ethylene oxide units, 34% strength; |
| 11.20 | parts of butyl methacrylate; |
| 573.80 | parts of methyl methacrylate; |
| 20.80 | parts of methacrylic acid; and |
| 6.70 | parts of methacrylamide | with a high-speed stirrer until a stable emulsion was formed.

The monomer emulsion II was prepared by stirring the following:

| | |
|---|---|
| 92.18 | parts of water; |
| 5.82 | parts of $C_{11}$-alkyl ether sulfate Na salt with about 7 ethylene oxide units, 34% strength; |
| 101.30 | parts of butyl methacrylate; |
| 63.70 | parts of methyl methacrylate; |
| 6.93 | parts of methacrylic acid; and |
| 2.24 | parts of methacrylamide | with a high-speed stirrer until a stable emulsion was formed.

Example 5

Preparation of a Wood Varnish

A varnish was prepared by mixing the following ingredients:

| | |
|---|---|
| 745 parts | of polymer dispersion as per Example 1, 2, 3, 4 or Comparison Example 1; |
| 172 parts | of water; |
| 2 parts | of antifoam based on mineral oil; |
| 10 parts | of 1,2-propanediol; |
| 10 parts | of Texanol; |
| 2 parts | of aminomethylpropanol; |
| 4 parts | of polyurethane thickener; |
| 25 parts | of methoxybutanol; and |
| 30 parts | of 30% polyethylene wax emulsion (softening point 100° C.) |

The ingredients were mixed at room temperature, with stirring, to form a varnish. Table 1 lists the properties of the varnish films.

TABLE 1

Testing of the dispersions in a clear varnish

Testing in the clear coat

| Dispersion | Blocking resistance[1] | Scratch resistance[2] | König[3] pendulum hardness(s) | Elongation at break in %[4] | Evaluation following Klimatron weathering[5] |
|---|---|---|---|---|---|
| Example 1 | 1 | good | 35 | 214 | crack-free (0) |
| Example 2 | 1 | good | 35 | 135 | crack-free (0) |
| Example 3 | 1 | good | 36 | 130 | crack-free (0) |
| Example 4 | 2 | good | 43 | 59 | crack-free (0) |
| Comparison Example 1 | did not form a film since MFT too high | | | | |

[1]To test the blocking resistance, hiding-power cards from BYK Mallinckrodt or Morest were coated in a wet-film thickness of 50 μm. After drying at room temperature for 24 hours, two coated cards were placed with their coated sides together and were subjected at room temperature for 2 h to a force of $3.1 \times 10^4$ N/m² (0.32 kp/cm²). Subsequently the force required to separate the cards again was determined. Evaluation scale:
Rating 0: 0 N/m², rating 1: 0.1–0.8 × 10⁴ N/m², rating 2: 0.81–1.6 × 10⁴ N/m², rating 3: 1.61–2.4 × 10⁴ N/m², rating 4: 2.41–3.2 × 10⁴ N/m², rating 5: >3.2 × 10⁴ N/m².
[2]300 μm varnish applied to wood at room temperature, assessed after 7 days.
[3]100 μm varnish applied to glass, measured after 7 days.
[4]300 μm varnish applied at room temperature to PE film, measured after 7 days.
[5]Two coats of varnish applied to pinewood boards. After drying for at least 7 days, Klimatron accelerated weathering is begun. After 400 cycles, cracking/blistering is assessed: 0 = no cracks/blisters, 6 = severe cracks/blisters

Example 6

TABLE 2

Preparation of an emulsion paint

| Item | Constituents | Supplier | Parts by weight |
|---|---|---|---|
| | Pigment paste | | |
| 1 | Water | | 11.0 |
| 2 | Polyacrylate dispersant (® Lopon) | BK Ladenburg | 8.0 |
| 3 | Aminomethylpropanol (wetting | Angus Chemie | 2.0 |

TABLE 2-continued

Preparation of an emulsion paint

| Item | Constituents | Supplier | Parts by weight |
|------|--------------|----------|-----------------|
|  | agent ® AMP 90) |  |  |
| 4 | Antifoam (® Agitan 295) | Münzing Chemie | 2.0 |
| 5 | Preservative (® Mergal K 10) | Riedel de Haën | 2.0 |
| 6 | Propylene glycol |  | 40.0 |
| 7 | Titanium dioxide (® Kronos 2300) | Kronos Titan | 210.0 |
| Binders and additives | | | |
| 8 | Polymer dispersion as per Examples 1–4 or Comparison Example 1 |  | 560.0 |
| 9 | Conc. ammonia (25% strength) |  | 3.0 |
| 10 | Propylene glycol |  | 25.0 |
| 11 | Methoxybutanol |  | 15.0 |
| 12 | Film-forming auxiliary (Texanol) | Eastman | 5.0 |
| 13 | Wax emulsion 30% (® Südranol 240) | Süddeutsche Emulsions-Chemie | 20.0 |
| 14 | Associative polyacrylate thickener (® Mowilith VDM 7000, about 30%) | Hoechst | 20.0 |
| 15 | Water |  | 77.0 |
|  |  |  | 1000.0 |

Characteristics
Solids Content: about 50
Pigmentation ratios:
Dispersion:pigment/filler mixture: about 1:0.38
Binder solids:pigment/filler mixture: about 1:0.75
Pigment volume concentration (p.v.c.): about 17%
Specific weight at 20° C.: about 1.2 kg/l Preparation The starting materials of items 1–7 (Table 2) were weighed out in succession and were each mixed thoroughly. This pigment paste was subsequently dispersed for about 20 minutes in a dissolver (for example from IKA; Janke und Kunkel) at about 6000 rpm and with an appropriate dispersion vessel/dissolver disk geometry. After the paste had been cooled, the substances of items 8 and 9 were mixed beforehand and then added. The substances of items 10–15 were then each added with thorough stirring, in some cases with premixing (as indicated in the formula). Stirring was continued until a homogeneous mixture had been formed. Subsequently, the pH was checked and, if necessary, adjusted with ammonia (25% strength) to a value of about 8.5.

Table 3 summarizes the properties of the emulsion-paint films.

TABLE 3

Testing of the dispersions in an emulsion-paint formulation

| | Testing in the emulsion paint | | | | |
|---|---|---|---|---|---|
| Dispersion | Blocking resistance[1] | Scratch resistance[2] | Gloss at 20°/60°[3] | Elongation at break in %[4] | Evaluation following in Klimatron weathering[5] |
| Example 1 | 0 | good | 56/77 | 41 | no cracks; good (0) |
| Example 2 | 0 | good | 55/79 | 42 | no cracks; good (0) |
| Example 3 | 1 | good | 59/80 | 47 | no cracks; good (0) |
| Example 4 | 1 | good | 60/81 | 61 | no cracks; good (0) |
| Comparison Example 1 | did not form a film | | | | |

[1]To test the blocking resistance, hiding-power cards from BYK Mallinckrodt or Morest were coated in a wet-film thickness of 50 μm. After drying for 24 hours, two coated cards were placed with their coated sides together and were subjected at room temperature for 2 h to a force of $3.1 \times 10^4$ N/m² (0.32 kp/cm²). Subsequently the force required to separate the cards again is determined. Evaluation scale:
Rating 0: 0 N/m², rating 1: $0.1–0.8 \times 10^4$ N/m², rating 2: $0.81–1.6 \times 10^4$ N/m², rating 3: $1.61–2.4 \times 10^4$ N/m², rating 4: $2.41–3.2 \times 10^4$ N/m², rating 5: $>3.2 \times 10^4$ N/m².
[2]300 μm varnish applied to wood, assessed after 7 days.
[3]300 μm varnish applied to glass at room temperature and gloss measured after 7 days.
[4]300 μm varnish applied to PE film and measured after 7 days.
[5]2 coats on pinewood boards. After drying for at least 7 days, accelerated weathering in a Klimatron is begun. Assessment of cracking/blistering after 400 cycles. Evaluation 0 = no change; 6 = severe cracks/blisters.

All of the documents described herein, as well as priority document German Application No. 196 09 509.3, filed on Mar. 11, 1996, are incorporated by reference herein in their entirety.

While the invention has been described in detail by reference to the non-limiting examples and particularly preferred embodiments, those skilled in the art will appreciate that various modifications can be made to the invention without departing from the spirit and scope thereof.

What is claimed is:

1. A polymer dispersion having a minimum film-forming temperature in the range of from 0 to 40° C., which is prepared by stepwise emulsion polymerization comprising polymerizing in a first stage a monomer composition I comprising:

| | |
|---|---|
| from 50 to 68.5% by weight | of monomers A whose homopolymers have a glass transition temperature ($T_g$) below 0° C.; |
| from 30 to 50% by weight | of monomers B whose homopolymers have a glass transition temperature ($T_g$) above 65° C.; |
| from 0.5 to 5% by weight | of α,β-unsaturated carboxylic acids and/or carboxamides C which are copolymerizable with A and B; |
| from 1 to 7.5% by weight | of ethylenically unsaturated monomers D containing keto groups; and |
| from 0 to 10% by weight | of other ethylenically unsaturated monomers E which do not contain a nitrogen atom, | whereby the weight percentages in each case are based on the overall amount of the monomers used in the first stage to form polymer I, and then polymerizing in a second stage a monomer composition II comprising:

| | |
|---|---|
| from 5 to 45% by weight | of monomers A' whose homopolymers have a glass transition temperature ($T_g$) below 0° C.; |
| from 65 to 95% by weight | of monomers B' whose homopolymers have a glass transition temperature ($T_g$) above 65° C; |
| from 0 to 4% by weight | of α,β-unsaturated carboxylic acids and/or carboxamides C' which are copolymerizable with A' and B'; |
| from 0 to 5% by weight | of ethylenically unsaturated monomers D' containing keto groups; and |
| from 0 to 10% by weight | of other ethylenically unsaturated monomers E' which do not contain a nitrogen atom, | whereby the weight percentages in each case are based on the overall amount of the monomers used in the second stage, where the polymerization is carried out in a weight ratio of the monomer composition I to the monomer composition II of from 50:50 to 75:25.

2. A polymer dispersion as claimed in claim 1, wherein the monomer composition I comprises at least 50% by weight of styrene, based on the overall amount of the monomers B.

3. A polymer dispersion as claimed in claim 1, wherein the monomer D or monomer D' comprises diacetone(meth) acrylamide.

4. A polymer dispersion as claimed in claim 1, wherein the monomer composition I for the first stage contains a larger proportion of monomers C and D than the monomer composition II for the second stage.

5. A polymer dispersion as claimed in claim 1, wherein monomer composition I and/or monomer composition II further comprise polyfunctional carboxylic hydrazides.

6. A polymer dispersion as claimed in claim 1, wherein monomers A and monomers A' have homopolymers having a glass transition temperature below −10°C.

7. A polymer dispersion as claimed in claim 6, wherein the monomers A and A', whose homopolymers have a glass transition temperature below 0 degrees C., are selected from the group consisting of $C_1$–$C_{12}$-alkyl esters of acrylic acid and $C_5$–$C_{12}$-alkyl esters of methacrylic acid.

8. A polymer dispersion as claimed in claim 1, wherein monomers B and monomers B' have homopolymers having a glass transition temperature above 85° C.

9. A polymer dispersion as claimed in claim 8, wherein monomers B and monomers B' are selected from the group consisting of styrene, vinyltoluene, acrylonitrile, methacrylonitrile, and $C_1$–$C_4$-alkyl esters or cycloalkyl esters of methacrylic acid.

10. A polymer dispersion as claimed in claim 1, wherein the α,β-unsaturated carboxylic acids and/or carboxamides C and C' that are copolymerizable with A and B or A' and B' are selected from the group consisting of acrylic acid, methacrylic acid, itaconic acid, acrylamide and methacrylamide.

11. A polymer dispersion as claimed in claim 1, wherein the monomers D and monomers D' are selected from the group consisting of acetoacetoxyethyl methacrylate, acetoacetoxybutyl methacrylate, acrylamidomethylacetylacetone, vinyl acetoacetate, diacetoneacrylamide, diacetonemethacrylamide, and butanonemethacrylic esters.

12. A polymer dispersion having a minimum film-forming temperature in the range of from 0 to 40° C., which is prepared by stepwise emulsion polymerization comprising polymerizing in a first stage a portion of monomer composition I comprising:

| | |
|---|---|
| from 50 to 68.5% by weight | of monomers A whose homopolymers have a glass transition temperature ($T_g$) below 0° C.; |
| from 30 to 50% by weight | of monomers B whose homopolymers have a glass transition temperature ($T_g$) above 65° C.; |
| from 0.5 to 5% by weight | of α,β-unsaturated carboxylic acids and/or carboxamides C which are copolymerizable with A and B; |
| from 1 to 7.5% by weight | of ethylenically unsaturated monomers D containing keto groups; and |
| from 0 to 10% by weight | of other ethylenically unsaturated monomers E which do not contain a nitrogen atom, | whereby the weight percentages in each case are based on the overall amount of the monomers used in the first stage to form polymer I, and then polymerizing in a second stage (a) the remaining portion of monomer composition I and (b) a monomer composition II comprising:

| | |
|---|---|
| from 5 to 45% by weight | of monomers A' whose homopolymers have a glass transition temperature ($T_g$) below 0° C.; |
| from 65 to 95% by weight | of monomers B' whose homopolymers have a glass transition temperature ($T_g$) above 65° C.; |
| from 0 to 4% by weight | of α,β-unsaturated carboxylic acids and/or carboxamides C' which are copolymerizable with A' and B'; |
| from 0 to 5% by weight | of ethylenically unsaturated monomers D' containing keto groups; and |
| from 0 to 10% by weight | of other ethylenically unsaturated monomers E' which do not contain a nitrogen atom, | whereby the weight percentages in each case are based on the overall amount of monomers used in the second stage, where the polymerization is carried out in a weight ratio of the monomer composition I to the monomer composition II of from 50:50 to 75:25.

13. A polymer dispersion as claimed in claim 12, wherein the monomer composition I comprises at least 50% by weight of styrene, based on the overall amount of the monomers B.

14. A polymer dispersion as claimed in claim 12, wherein the monomer D and the monomer D' comprises diacetone (meth)acrylamide.

15. A polymer dispersion as claimed in claim 12, wherein the monomer composition I for the first stage contains a larger proportion of monomers C and D than the monomer composition II for the second stage.

* * * * *